United States Patent
Park et al.

(10) Patent No.: US 8,565,157 B2
(45) Date of Patent: Oct. 22, 2013

(54) METHOD OF TRANSMITTING AND RECEIVING CARRIER CONFIGURATION INFORMATION

(75) Inventors: Gi Won Park, Seoul (KR); Young Soo Yuk, Sungnam-si (KR); Yong Ho Kim, Seoul (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 255 days.

(21) Appl. No.: 13/122,724

(22) PCT Filed: Nov. 23, 2009

(86) PCT No.: PCT/KR2009/006888
§ 371 (c)(1), (2), (4) Date: Apr. 5, 2011

(87) PCT Pub. No.: WO2010/059003
PCT Pub. Date: May 27, 2010

(65) Prior Publication Data
US 2011/0261712 A1    Oct. 27, 2011

Related U.S. Application Data

(60) Provisional application No. 61/116,644, filed on Nov. 21, 2008.

(30) Foreign Application Priority Data

Feb. 12, 2009    (KR) .................. 10-2009-0011413

(51) Int. Cl.
*H04Q 7/00*    (2006.01)

(52) U.S. Cl.
USPC .......................................... 370/328; 370/329

(58) Field of Classification Search
USPC ............... 370/328, 329; 455/438, 456.1, 458, 455/522, 440
See application file for complete search history.

(56) References Cited

U.S. PATENT DOCUMENTS

| | | | |
|---|---|---|---|
| 6,611,506 B1 | 8/2003 | Huang et al. | |
| 2005/0282562 A1* | 12/2005 | Lee et al. | 455/458 |
| 2006/0293056 A1 | 12/2006 | Kim et al. | |
| 2008/0273493 A1 | 11/2008 | Fong | |
| 2009/0131084 A1* | 5/2009 | Comstock et al. | 455/458 |
| 2010/0081454 A1* | 4/2010 | Wang et al. | 455/456.1 |
| 2011/0261704 A1* | 10/2011 | Etemad | 370/252 |

FOREIGN PATENT DOCUMENTS

WO    2005/060132    6/2005

* cited by examiner

*Primary Examiner* — Chuong T Ho
(74) *Attorney, Agent, or Firm* — Lee, Hong, Degerman, Kang & Waimey

(57) ABSTRACT

A method for allowing a mobile station to reliably receive a paging message in a multi-carrier system is disclosed. A method for controlling a mobile station to receive carrier configuration information (CCI) in a wireless access system supporting multiple carriers includes a) receiving a first CCI including information about configuration of the multiple carriers from a first base station, b) receiving a second CCI including information about configuration of the multiple carriers from a second BS, and c) determining whether to perform location update and carrier switching using the first CCI and the second CCI.

8 Claims, 11 Drawing Sheets

Fig. 6
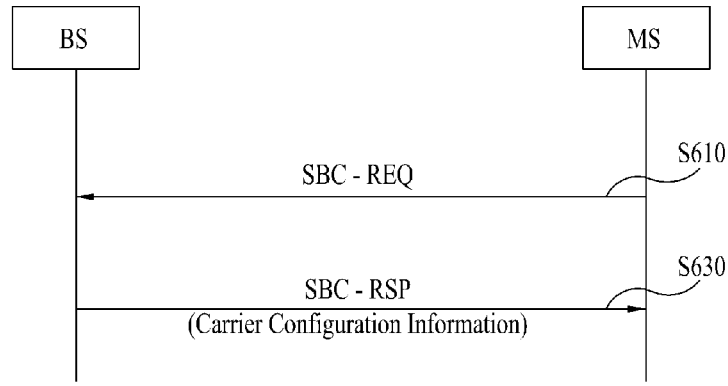
(a)
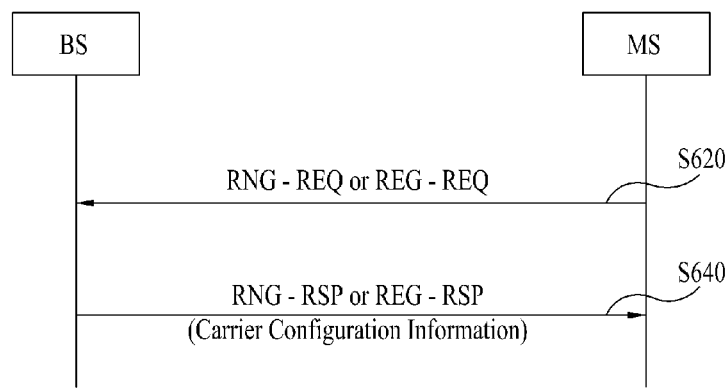
(b)

METHOD OF TRANSMITTING AND RECEIVING CARRIER CONFIGURATION INFORMATION

CROSS-REFERENCE TO RELATED APPLICATIONS

This application is the National Stage filing under 35 U.S.C. 371 of International Application No. PCT/KR2009/006888, filed on Nov. 23, 2009, which claims the benefit of earlier filing date and right of priority to Korean Application No. 10-2009-0011413, filed on Feb. 12, 2009, and also claims the benefit of U.S. Provisional Application Ser. No. 61/116,644, filed on Nov. 21, 2008, the contents of which are all incorporated by reference herein in their entirety.

TECHNICAL FIELD

The present invention relates to a wireless access system for a multi-carrier environment, and more particularly to methods for allowing a mobile station to reliably receive a paging message when the mobile station is handed over in a multi-carrier system.

BACKGROUND ART

Preferably, paging groups are large enough for a mobile station (MS) to stay most of its time within the same paging group and small enough to render paging overhead reasonable.

A paging group may include one or more base stations, and one base station may be contained in one or more paging groups. The paging groups may be defined in a management system. A paging group may use a paging group-action backbone network message. In addition, a paging controller uses another backbone message (paging-announce message), to manage the list of mobile stations in an idle mode and initiate paging of a mobile station on all base stations belonging to a paging group.

DISCLOSURE OF INVENTION

Technical Problem

Accordingly, the present invention is directed to a method for transmitting and receiving carrier configuration information that substantially obviates one or more problems due to limitations and disadvantages of the related art.

An object of the present invention devised to solve the problem lies on a reliable communication method for a multi-carrier environment.

Another object of the present invention devised to solve the problem lies on a method for allowing a mobile station to receive a paging message by effectively utilizing carriers in a multi-carrier environment.

Another object of the present invention devised to solve the problem lies on a method for enabling an idle mode mobile station (MS) having moved to a neighbor cells supporting different carriers to update its location by switching a carrier to another carrier.

A further object of the present invention devised to solve the problem lies on a method for enabling an idle mode MS to receive a paging message using carrier configuration information.

Technical Solution

In order to solve the above-mentioned technical problems, the present invention provides a method for enabling an MS to reliably receive a paging message when the MS is handed over in a multi-carrier system, and the MS for use in the same.

The object of the present invention can be achieved by providing a method for controlling a mobile station to receive carrier configuration information (CCI) in a wireless access system supporting multiple carriers, the method including a) receiving a first CCI including information about configuration of the multiple carriers from a first base station, b) receiving a second CCI including information about configuration of the multiple carriers from a second BS, and c) determining whether to perform location update and carrier switching using the first CCI and the second CCI.

The first CCI and the second CCI each may include at least one of configuration information of the multiple carriers supplied from the first base station and the second base station.

The first CCI and the second CCI may include indexes of the multiple carriers and a paging group ID supported by each of the multiple carriers.

The method may further include performing, by the mobile station, location update to the second base station, when the second base station does not provide a paging group ID assigned to the mobile station.

The method may further include performing, by the mobile station, carrier switching to one of the multiple carriers supplied from the second base station, when the second base station does not provide the carrier currently used by the mobile station.

The first CCI and the second CCI may be transmitted using one of a broadcast channel (BCH), a mobile neighbor BS advertisement (MOB_NBR-ADV) message, and a system information message.

The first CCI and the second CCI may be transmitted using one of a ranging response (RNG-RSP) message, a registration response (REG-RSP) message, and a basic capability response (SBC-RSP) message.

The method may further include receiving a super frame header including a first field indicating a frame via which a system information message including the first CCI is transferred from the first base station, and receiving a super frame header including a second field indicating a frame via which a system information message including the second CCI is transferred from the second base station, wherein the receiving step a) is performed at the frame indicated by the first field, and the receiving step b) is performed at the frame indicated by the second field.

In another aspect of the present invention, provided herein is a method for controlling a serving base station to receive carrier configuration information (CCI) in a wireless access system supporting multiple carriers including transmitting a super frame header including a field indicating a frame via which a message including the CCI is transferred, transmitting the message including the CCI via the frame indicated by the field, wherein the CCI includes indexes of the multiple carriers and a paging group ID supported by each of the multiple carriers.

The CCI may include configuration information of the multiple carriers about at least one of the serving base station and the neighboring base station. The message may be one of a broadcast channel (BCH) and a system information message.

In another aspect of the present invention, provided herein is a mobile station for a wireless access system supporting multiple carriers including a receiver for receiving an external radio signal, and a processor, wherein the receiver receives first carrier configuration information (CCI) including information about configuration of the multiple carriers from a first base station, and receives second CCI including information about configuration of the multiple carriers from a second BS, and the processor determines whether to perform location update and carrier switching using the first CCI and the second CCI.

The first CCI and the second CCI may include indexes of the multiple carriers and a paging group ID supported by each of the multiple carriers.

The processor may perform location update to the second base station when the second base station does not provide a paging group ID assigned to the mobile station.

The processor may perform carrier switching to one of the multiple carriers supplied from the second base station when the second base station does not provide the carrier currently used by the mobile station.

The receiver receives a super frame header including a first field, indicating a frame via which a system information message including the first CCI is transferred, from the first base station. In addition, the receiver receives a super frame header including a second field, indicating a frame via which a system information message including the second CCI is transferred, from the second base station. In this case, the first CCI is received at the frame indicated by the first field, and the second CCI is received at the frame indicated by the second field.

It will be appreciated by persons skilled in the art that the objects that could be achieved with the present invention are not limited to what has been particularly described hereinabove and the above and other objects that the present invention could achieve will be more clearly understood from the following detailed description taken in conjunction with the accompanying drawings Advantageous Effects Exemplary embodiments of the present invention have the following effects.

First, the present invention can provide a multi-carrier environment with reliable communication.

Second, the present invention uses carrier configuration information in the multi-carrier environment such that the MS can effectively receive a paging message.

Third, if an idle mode MS moves to a neighbor cell supporting different carriers in the multi-carrier environment, the present invention enables the idle mode MS to update its location by switching a carrier to another carrier.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention, illustrate embodiments of the invention and together with the description serve to explain the principle of the invention.

In the drawings:

FIG. 6 is a flowchart illustrating a method for transmitting carrier configuration information according to yet another embodiment of the present invention.

BEST MODE FOR CARRYING OUT THE INVENTION

Figure 1:
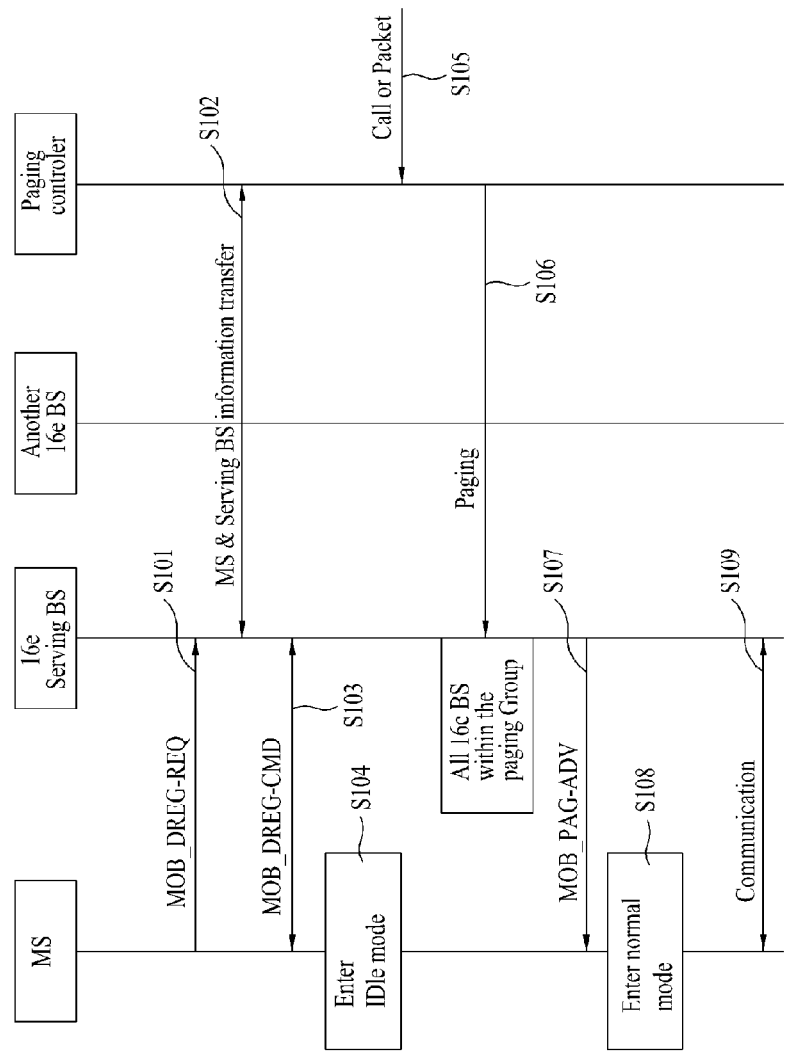
FIG. 1 is a flowchart illustrating a paging procedure in an Institute of Electrical and Electronics Engineers (IEEE) 802.16 system which is a wireless access system.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The present invention relates to a wireless access system. More particularly, the present invention relates to methods for enabling a mobile station (MS) to reliably receive a paging message when the MS is handed over in a multi-carrier system.

Exemplary embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the description of drawings, procedures or steps, which may ruin the substance of the present invention, are not explained. And, procedures or steps, which can be understood by those skilled in the art, are not explained as well.

In exemplary embodiments of the present invention, a description is made of a data transmission and reception relationship between a Base Station (BS) and an MS. Herein, the term BS refers to a terminal node of a network, which communicates directly with the MS. In some cases, a specific operation described as performed by the BS may be performed by an upper node of the BS.

Namely, it is apparent that, in a network comprised of a plurality of network nodes including a BS, various operations performed for communication with an MS may be performed by the BS, or network nodes other than the BS. The term BS may be replaced with the term fixed station, Node B, eNode B (eNB), access point, etc. The term MS may be replaced with the term User Equipment (UE), Subscriber Station (SS) Mobile Subscriber Station (MSS), Advanced MS (AMS), mobile terminal, etc.

A transmitter means a node that transmits voice or data service and a receiver means a node that receives voice or data service. Hence, an MS may be a transmitter and a BS may be a receiver, on an uplink. Likewise, the MS may be a receiver and the BS may be a transmitter, on a downlink.

Meanwhile, the MS may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, etc.

Exemplary embodiments of the present invention may be achieved by various means, for example, hardware, firmware, software, or a combination thereof.

In a hardware configuration, methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, and/or microprocessors.

In a firmware or software configuration, the methods according to the exemplary embodiments of the present invention may be implemented in the form of a module, a procedure, a function, etc. performing the above-described functions or operations. A software code may be stored in a memory unit and executed by a processor. The memory unit is located at the interior or exterior of the processor and may transmit and receive data to and from the processor via various known means.

Exemplary embodiments of the present invention are supported by standard documents disclosed for at least one of wireless access systems including Institute of Electrical and Electronics Engineers (IEEE) 802 systems, $3^{rd}$ Generation Project Partnership (3GPP) systems, 3GPP Long Term Evolution (LTE) systems, and 3GPP2 systems. In particular, the steps or parts, which are not described to clearly reveal the technical idea of the present invention, in the exemplary embodiments of the present invention may be supported by the above documents. All terminologies used herein may be supported by at least one of P802.16-2004, P802.16e-2005, and P802.16Rev2 documents which describe the standards of IEEE 802.16.

Specific terms used in the following description are provided to help the understanding of the present invention. These specific terms may be replaced with other terms within the scope and spirit of the present invention.

It is assumed that the following embodiments use a multi-carrier scheme. Therefore, a mobile station (MS) and a base station (BS) can effectively communicate with each other using a plurality of carriers. The following embodiments of the present invention may also be applied to other wireless access technologies other than the IEEE 802.16e/m network (and/or 3GPP LTE).

In the following embodiments of the present invention, a primary carrier and a secondary carrier are defined. The MS may communicate with the BS using one primary carrier and several secondary carriers.

In the embodiments of the present invention, for convenience of description and better understanding of the present invention, a carrier capable of transmitting and receiving control information and data is defined as a Fully Configured Carrier (FCC), and another carrier capable of transmitting and receiving some parts of the control information and data is defined as a Partially Configured Carrier (PCC).

In this case, the primary carrier may be defined as an FCC, and the secondary carrier may be defined as an FCC or a PCC. Generally, the MS can acquire all control information and information of subcarriers using the primary carrier. In addition, the MS and the BS can transmit and receive data using the secondary carrier. In the embodiments of the present invention, a Fully Configured Secondary Carrier (FCSC) established in a specific MS may be established as a primary carrier of another MS.

FIG. 1 is a flowchart illustrating a paging procedure in an IEEE 802.16 system which is a wireless access system.

In an idle mode, paging may be performed on a paging group basis. For instance, an MS may be a member of one or more paging groups. In each paging group, upon receipt of an incoming call for an MS or a packet directed to the MS from an external network, a paging controller pages the MS to detect it. For the paging, specifically, the paging controller may transmit a paging message to all BSs within the paging group and, upon receipt of the paging message, each BS broadcasts a Mobile Paging Advertisement (MOB_PAG-ADV) message to MSs.

Referring to FIG. 1, an MS transmits a Mobile Deregistration Request (MOB_DREG-REQ) message to a serving BS to transition from normal mode to idle mode at step S101.

Upon receipt of the MOB_DREG-REQ message, the serving BS may transmit and receive serving BS information and MS information to and from a paging controller at step S102. Specifically, the serving BS may notify the paging controller of an Identifier (ID) of the MS that intends to enter the idle mode and an ID of the serving BS. The PC may transmit a paging group ID or an ID of the paging controller to the serving BS. The paging group ID or the paging controller ID may be used for transmission and reception of a paging message at step S102.

The serving BS may a Mobile Deregistration Command (MOB_DREG-CMD) message to the MS in response to the MOB_DREG-REQ message at step S103. The MOB_DREG-CMD message may include paging information (e.g. a paging cycle, a paging offset, and a paging listening interval). The MOB_DREG-CMD message may further include the paging controller ID and the paging group ID.

Upon receipt of the MOB_DREG-CMD message, the MS enters the idle mode at step S104. The MS may receive a paging message based on the paging information received by the MOB_DREG-CMD message. During a paging listening interval, the MS may monitor a radio channel to determine whether there is a paging message directed to it. The MS may operate in sleep mode during the remaining time periods, thereby saving battery power.

At step S105, the paging controller may receive an incoming call or an external packet that is transmitted from an external network to the MS.

Then the paging controller may perform a paging procedure for searching for the MS upon receipt of the incoming call or external packet. At step S106, the paging controller transmits a paging message to all BSs of the paging group.

Upon receipt of the paging message, the BSs of the paging group broadcast a Mobile Paging Advertisement (MOB_PAG-ADV) message to their managed MSs at step S107.

The MS checks the MOB_PAG-ADV message and if the paging controller has paged the MS, it may enter a normal mode at step S108 and communicate with the serving BS at step S109.

The above-mentioned messages and procedures of FIG. 1 may also be applied to the following embodiments of the present invention.

1. Method for transmitting Carrier Configuration Information (CCI)

A variety of methods for transmitting carrier configuration information (CCI) will hereinafter be described in detail. Specifically, the CCI may help an MS in an idle mode to switch a carrier to another carrier so that the MS of the idle mode can reliably receive a paging message using the switched carrier.

Figure 2:
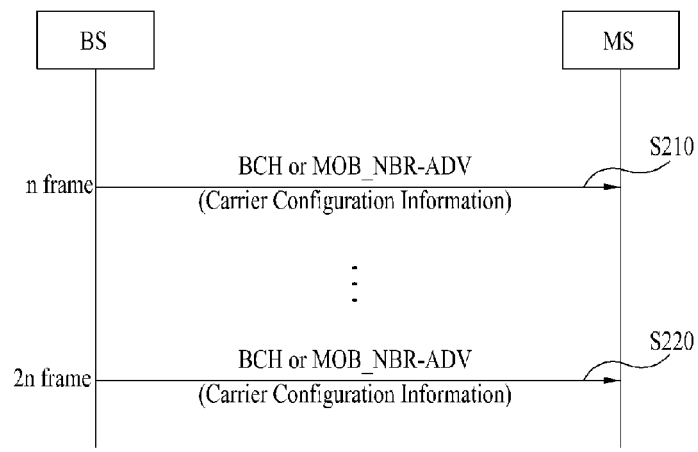
FIG. 2 is a flowchart illustrating a method for transmitting carrier configuration information according to one embodiment of the present invention.

FIG. 2 is a flowchart illustrating a method for transmitting carrier configuration information according to one embodiment of the present invention.

FIG. 2 shows an example of a method for transmitting carrier configuration information using a broadcast message. At steps S210 and S220, a serving BS may periodically or non-periodically a Broadcast Channel (BCH) or MOB_NBR-ADV message including the serving BS's CCI and/or the neighbor BS's CCI to the MS.

The following table 1 shows an exemplary format of a CCI.

TABLE 1

| Fully Configured Carrier Index | PG ID |
|---|---|
| Carrier 1 | Paging Group ID supported by Carrier 1 |
| Carrier 2 | Paging Group ID supported by Carrier 2 |
| Carrier 3 | Paging Group ID supported by Carrier 3 |
| ~ | ~ |
| Carrier N | Paging Group ID supported by Carrier N |

If the MS decodes the CCI, it can recognize not only indexes of carriers supported by respective paging groups of a multi-carrier system but also information of paging group IDs supported by respective carriers.

The following table 2 shows a BCH or system information format including a CCI.

TABLE 2

| Syntax | Size (Bit) | Notes |
|---|---|---|
| BCH( ) or Additional system information( ) { | — | — |
| ~ | | |
| BS ID | | Serving BS ID |
| N_Fully_configured_Carrier | | The number of Fully Configured Carriers supported by Serving BS ID |

TABLE 2-continued

| Syntax | Size (Bit) | Notes |
|---|---|---|
| For(i=0; i< N_Fully_configured_Carrier; i++) { | | |
| Fully_Configured_Carrier ID | | Serving BS s Fully_Configured_Carrier ID |
| Paging Group ID | | Paging Group ID supported by Fully Configured Carrier of Serving BS |
| } // End of serving BS | | |
| Fully configured carrier information | | |
| N_Neighbor | | Total number of Neighbor base station |
| For(i=0; i< N_Neighbor; i++) { | | Neighbor Cell Carrier Configuration Information |
| BS ID | | Neighbor BS ID |
| N_Fully_Configured_Carriers | | Total number of Fully Configured Carriers |
| For(i=0; i<N_Fully_Configured_Carriers; i++) { | | |
| Fully_Configured_Carrier ID | | Fully_Configured_Carrier ID |
| Paging Group ID | | Paging Group ID supported by corresponding Fully Configured Carrier |
| } // End of Carrier configuration information | | |
| } // End of For(i=0; i< N_Neighbor; i++) | | |
| ~ | | |
| } //End of BCH( ) or Additional system information( ) | | |

Table 2 shows an exemplary case in which the serving BS CCI and the neighbor BS CCI are contained in a BCH. Referring to FIG. 2, the BCH may include a 'BS ID' field indicating an ID of a serving BS, a 'N_Fully_configured_Carrier' field indicating the number of FCCs supported by the serving BS, an 'Fully_Configured_Carrier ID' field indicating IDs of FCCs supported by the serving BS, and a 'Paging Group ID' field indicating an ID of a paging group supported by an FCC of the serving BS.

In addition, the BCH may further include an 'N_Neighbor' field indicating the total number of neighbor BSs, a 'BS ID' field indicating an ID of a neighbor BS, an 'N_Fully_Configured_Carriers' field indicating the total number of FCCs supported by a neighbor BS, a field indicating FCCs supported by a neighbor BS, and a 'Paging Group ID' field indicating an ID of a paging group supported by an FCC of a neighbor BS.

Although Table 2 has disclosed the CCI contained in the BCH, the CCI may also be contained in additional system information. The additional system information is an example of system information.

The following table 3 shows an example of a mobile neighbor BS advertisement (MOB_NBR_ADV) message including CCI.

TABLE 3

| Syntax | Size (Bit) | Notes |
|---|---|---|
| MOB_NBR-ADV( ) { | — | — |
| ~ | | |
| N_Neighbor | | Total number of Neighbor |
| For(i=0; i< N_Neighbor; i++) { | | |

TABLE 3-continued

| Syntax | Size (Bit) | Notes |
|---|---|---|
| BS ID | 5 | Neighbor BS ID |
| N_Fully_Configured_Carriers | | Total number of Fully Configured Carriers |
| For(i=0; i<N___Fully_Configured_Carriers; i++) { | | |
| Fully_Configured_Carrier ID | | Fully_Configured_Carrier ID |
| Paging Group ID | | Paging Group ID supported by corresponding Fully Configured Carrier |
| } // End of Carrier configuration information | | |
| } // End of For(i=0; i< N_Neighbor; i++) | | |
| ~ | | |
| } //End of NBR-ADV( ) | | |

Figure 3:
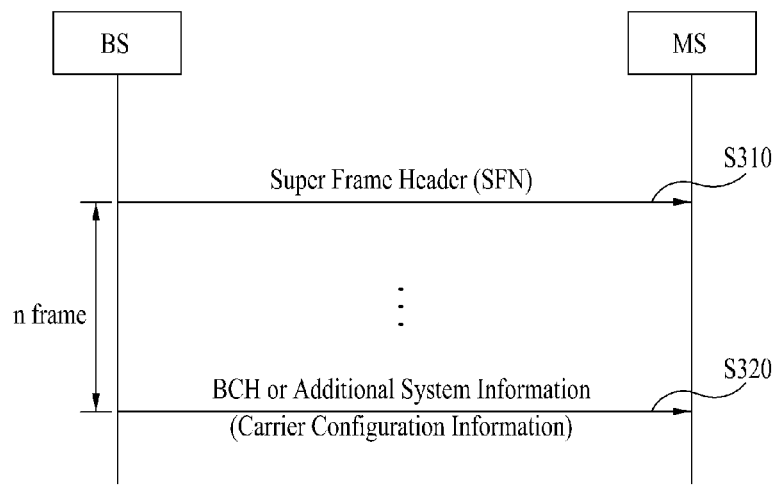
FIG. 3 is a flowchart illustrating a method for transmitting carrier configuration information according to another embodiment of the present invention.

Referring to FIG. 3, the MOB_NBR-ADV message may include an 'N_neighbor' field indicating the total number of neighbor BSs, a 'BS ID' field indicating a neighbor BS ID, an 'N_Fully_Configured_Carriers' field indicating the total number of FCCs supported by a neighbor BS, a 'Fully_Configured_Carrier ID' field indicating IDs of FCCs supported by a neighbor BS, and a 'Paging Group ID' field indicating a paging group ID supported by each FCC.

FIG. 3 is a flowchart illustrating a method for transmitting carrier configuration information according to another embodiment of the present invention.

The BS may transmit CCI to an MS using additional system information. Referring to FIG. 3, the BS may transmit a Start Frame Number (SFN) field or a Start SubFrame Number (SSFN) field to the MS at step S310. In this case, the SFN field indicates a number of a frame at which additional system information is transferred, and the SSFN field indicates a number of a subframe at which such additional system information is transferred. For example, the BS may transmit a Super Frame Header (SFH) including the SFN or SSFN field to the MS.

At step S320, the BS may transmit additional system information including the CCI to the MS at a frame indicated by the SFN field or a subframe indicated by the SSFN field. Also, the MS may acquire CCI by decoding a frame corresponding to the SFN or a subframe corresponding to the SSFN.

Figure 4:
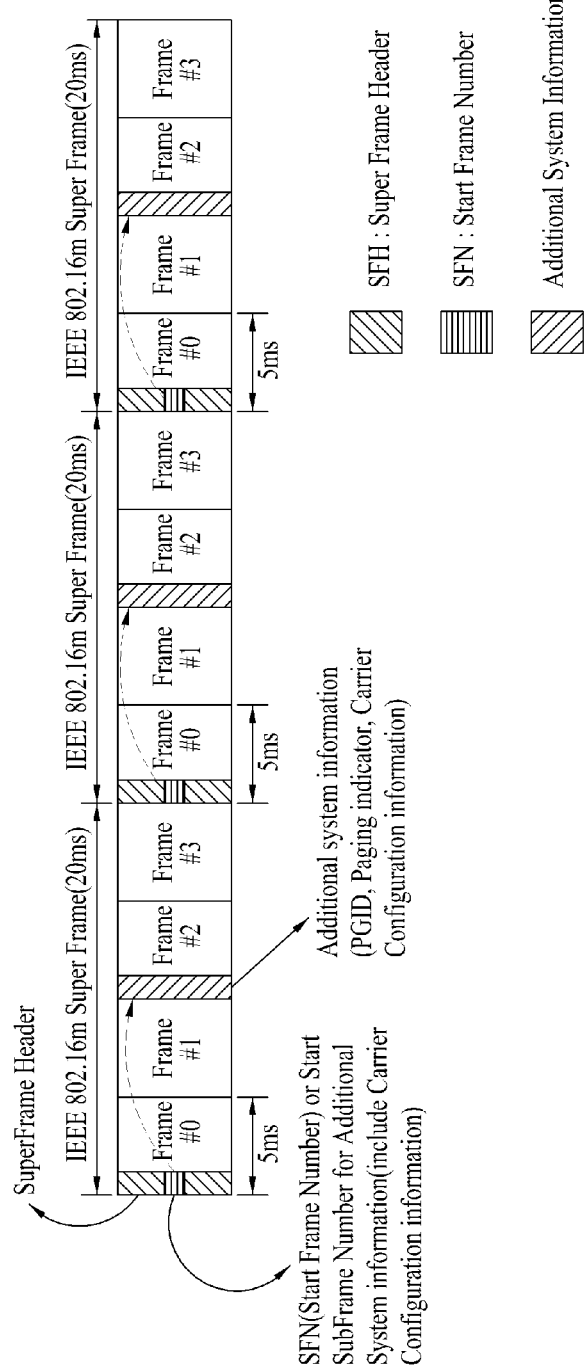
FIG. 4 is a structural diagram illustrating a super-frame structure to which the method for transmitting carrier configuration information is applied according to one embodiment of the present invention.

FIG. 4 is a structural diagram illustrating a super-frame structure to which the method for transmitting carrier configuration information (CCI) is applied according to one embodiment of the present invention.

Referring to FIG. 4, a super-frame for use in the IEEE 802.16m system has a size of 20 ms and may include one or more frames. In this case, it is preferable that one superframe be composed of 4 frames, each of which has a size of 5 ms. One frame includes one or more subframes. Preferably, 8 subframes may be contained in one frame.

The BS may transmit a Super-Frame Header (SFH) at a first frame (Frame #0) of each super-frame. That is, the BS may transmit the SFH including the SFN field to the MS at a first subframe of the first frame (Frame #0). In this case, the SFN field may indicate a frame or subframe at which additional system information including the CCI is transferred.

In one embodiment of the present invention, it is assumed that additional system information is transferred at a third frame (Frame #2). Therefore, the SFN may indicate the third frame (Frame #2), and the MS may decode additional system information at the third frame (Frame #2). In this case, the additional system information may further include a paging group ID (PG ID) and a paging indicator in addition to the CCI.

FIG. 3 is a flowchart illustrating a method for transmitting CCI using additional system information, and FIG. 4 is a structural diagram illustrating a frame for transmitting CCI using such additional system information. In a modified example of the embodiments shown in FIGS. 3 and 4, the BS may transmit the CCI using the BCH. In this case, the BS may include the CCI in only a specific BCH instead of all BCHs differently from FIG. 2, and transmit the specific BCH including the CCI to the MS. Therefore, overall system load can be greatly reduced as compared to the case in which the CCI is contained in each of all BCHs and transmitted.

Figure 5:
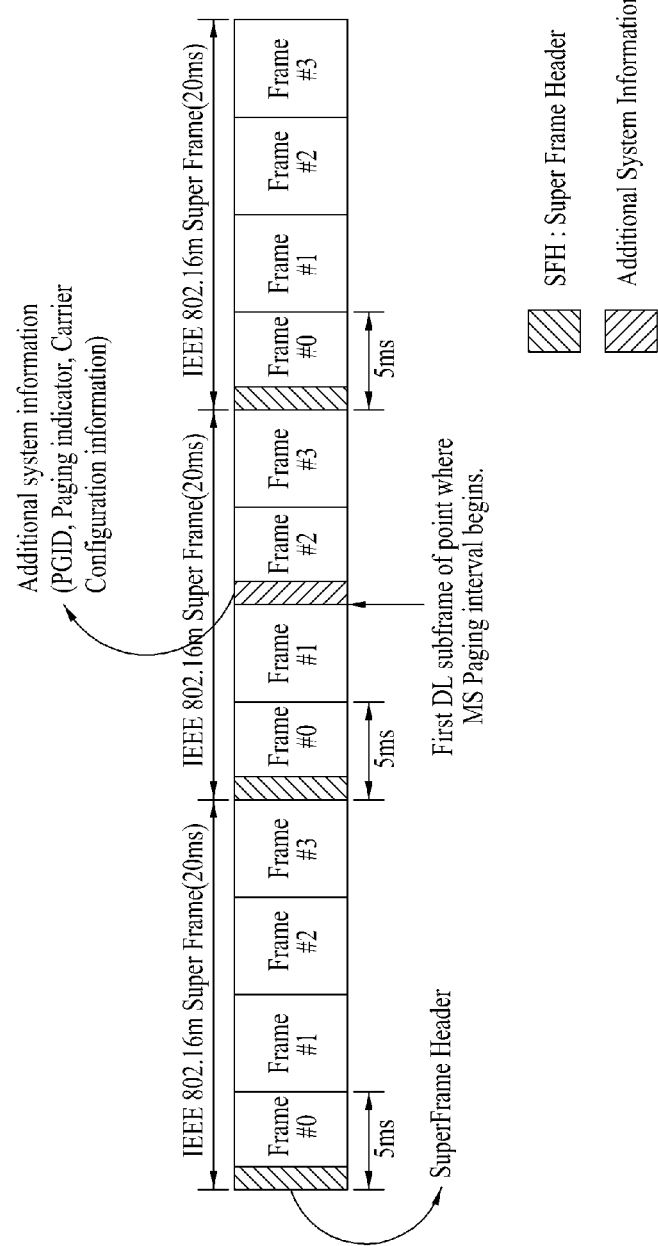
FIG. 5 is a structural diagram illustrating a super-frame structure to which the method for transmitting carrier configuration information is applied according to another embodiment of the present invention.

FIG. 5 is a structural diagram illustrating a super-frame structure to which the method for transmitting carrier configuration information (CCI) is applied according to another embodiment of the present invention.

The super-frame structure shown in FIG. 5 is similar to that of FIG. 4. However, FIG. 5 shows a method for transmitting the CCI to the MS at a fixed specific frame or subframe without using the SFN field in a different way from FIG. 4. In FIG. 5, it is assumed that the MS is in an idle mode, so that a procedure for allowing the MS to enter the idle mode may also refer to FIG. 1.

Referring to FIG. 5, the BS may transmit additional system information to the MS at a first downlink (DL) subframe at which a paging listening interval of the MS begins. The MS is woken up from the paging listening interval, and decodes a first DL subframe, such that it can acquire a PG ID, a paging indicator and CCI contained in additional system information.

In FIG. 5, it is assumed that the paging listening interval of the MS starts from a third frame (Frame #2). Therefore, the MS in the idle mode (idle mode MS) is woken up from the third frame, and decodes additional system information, such that it can acquire CCI.

If the additional system information is large in size so that the BS is unable to transmit all data at one DL subframe, the BS can continuously transmit additional system information at the next DL subframe.

FIG. 6 is a flowchart illustrating a method for transmitting carrier configuration information (CCI) according to another embodiment of the present invention.

The BS may transmit the CCI to the MS at an initial network entry process. In other words, the BS may transmit the CCI to the MS using a ranging response (RNG-RSP) message, a registration response (REG-RSP) message, and /or a basic capability response (SBC-RSP) message.

Referring to FIG. 6(a), the MS may transmit the SBC-REQ message for negotiating basic performance to the BS at the initial network entry process at step S610.

The BS may transmit the SBC-RSP message to the MS in response to the SBC-REQ message at step S630. In this case, the BS includes CCI in the SBC-RSP message, and transmits the resultant SBC-RSP message including the CCI to the MS. Therefore, the MS decodes the CCI contained in the SBC-RSP message, so that it can recognize multi-carriers supported by a current serving BS and/or a neighbor BS.

The following table 4 shows an example of the SBC-RSP message for use in embodiments of the present invention.

TABLE 4

| Syntax | Size (Bit) | Notes |
|---|---|---|
| SBC-RSP( ) { | — | — |
| ~ | | |
| N_Fully_Configured_Carriers | | Total number of Fully Configured Carriers |
| For(i=0; i<N_Fully_Configured_Carriers; i++) { | | |
| Fully_Configured_Carrier ID | | Fully_Configured_Carrier ID |
| Paging Group ID | | Paging Group ID supported by corresponding Fully Configured Carrier |
| } | | |
| ~ | | |
| } //End of SBC-RSP( ) | | |

Referring to Table 4, the SBC-RSP message may include an 'N_Fully_Configured_Carriers' field indicating the total number of FCCs, a 'Fully_Configured_Carrier' field indicating IDs of FCCs supported by a BS, and a 'Paging Group ID' field indicating a paging group (PG) ID supported by a corresponding FCC.

Referring to FIG. 6(b), the MS may transmit a ranging request (RNG-REQ) message to the BS so as to perform a ranging procedure in various ranging processes at step S620.

The BS may transmit a ranging response (RNG-RSP) message to the MS in response to the RNG-REQ message at step S640. In this case, the BS includes CCI in the RNG-RSP message, and transmits the resultant RNG-RSP message including the CCI to the MS. Accordingly, the MS decodes the CCI contained in the RNG-RSP message, so that it can recognize multi-carriers supported by a current serving BS and/or a neighbor BS.

In another aspect of the present invention, the MS may transmit a registration request (REG-REQ) message to the BS at the initial network entry process at step S620, so that the MS can be registered to the BS by the REG-REQ message.

In response to the REG-REQ message, the BS may transmit the REG-RSP message including the CCI to the MS at step S640. Therefore, the MS decodes the CCI of the RNG-RSP message, such that it can recognize multi-carriers supported by a current serving BS and/or a neighbor BS.

The following table 5 shows an example of the SBC-RSP message for use in embodiments of the present invention.

TABLE 5

| Syntax | Size (Bit) | Notes |
|---|---|---|
| RNG-RSP( )/REG-RSP( ) { | — | — |
| ~ | | |
| N_Fully_Configured_Carriers | | Total number of Fully Configured Carriers |
| For(i=0; i<N___Fully_Configured_Carriers; i++) { | | |
| Fully_Configured_Carrier ID | | Fully_Configured_Carrier ID |
| Paging Group ID | | Paging Group ID supported by corresponding Fully Configured Carrier |
| } | | |
| ~ | | |
| } //End of SBC-RSP( ) | | |

Referring to Table 5, a ranging response (RNG-RSP) message and/or the registration response (REG-RSP) message may include an 'N_Fully_Configured_Carriers' field indicating the total number of FCCs, a 'Fully_Configured_Carrier' field indicating IDs of FCCs supported by a BS, and a 'Paging Group ID' field indicating a paging group (PG) ID supported by a corresponding FCC.

2. Method for performing Location Update and Carrier Switching in Multi-Carrier System The method for performing location update and carrier switching in the above-mentioned multi-carrier system may be applicable to the above-mentioned embodiments shown in FIGS. 1 to 6.

Figure 7:
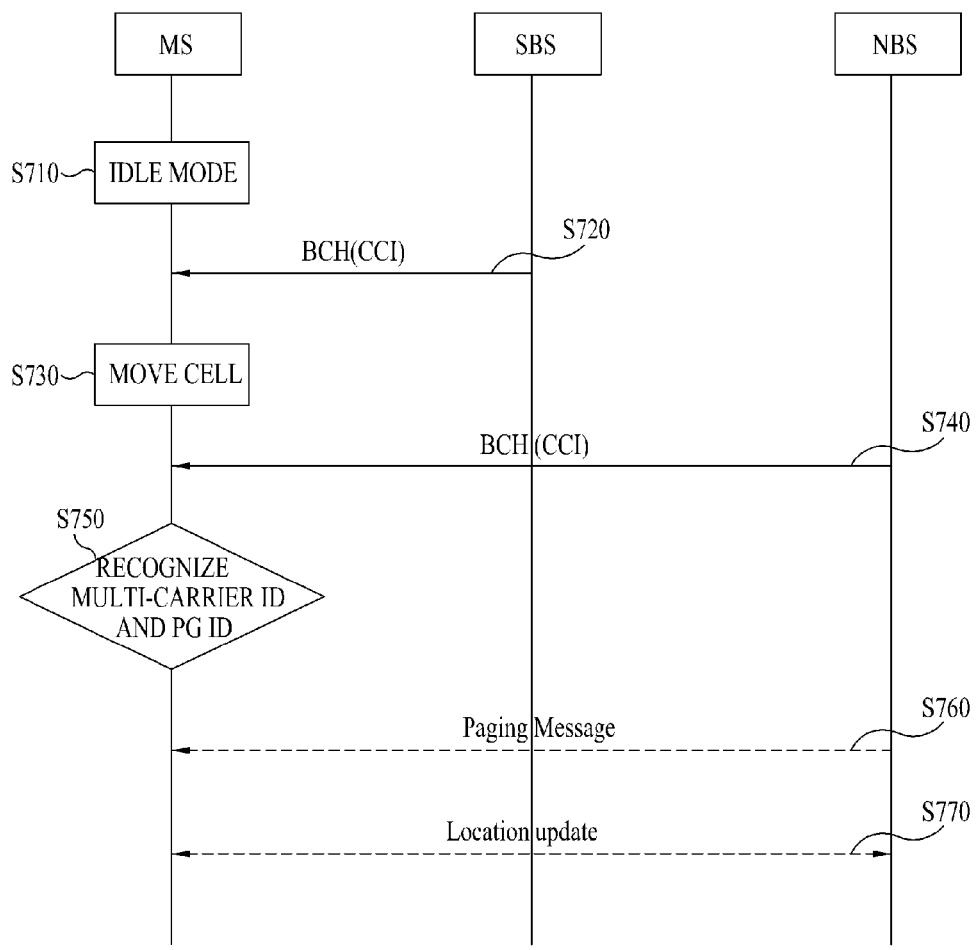
FIG. 7 is a flowchart illustrating a carrier switching method according to another embodiment of the present invention.

FIG. 7 is a flowchart illustrating a carrier switching method according to another embodiment of the present invention.

In FIG. 7, it is assumed that the MS is in the idle mode as in FIG. 1. That is, the MS may enter the idle mode through steps of FIG. 1 at step S710.

A Serving Base Station (SBS) can transmit the CCI to the MS using the methods shown in FIGS. 2 to 6. In FIG. 7, the BS may transmit a broadcast channel (BCH) including the CCI to the MS at step S720.

The MS in an idle mode may move to a cell area of a Neighboring Base Station (NBS) at step S730.

After the MS moved to the cell area of the NBS, the MS can receive the BCH including the CCI at the NBS. In other words, the NBS may broadcast the BCH including the CCI periodically or whenever a specific condition is satisfied at step S740.

The MS decodes the BCH received from the NBS, such that it can recognize a multi-carrier ID and paging group ID supported by the NBS. The MS recognizes the paging group ID of the NBS such that it can determine whether the BS belongs to the same paging group as that of the SBS. In addition, the MS recognizes the multi-carrier ID such that it can determine whether the multi-carrier currently used by the MS is supported by the NBS at step S750.

Meanwhile, in the case where the paging group (PG) ID of the NBS is equal to that of the SBS and the NBS also provides the multi-carrier currently used by the MS, the MS can receive the paging message received from the NBS at step S760. At this time, in the case where the PG ID of the SBS is equal to that of the NBS and the NBS does not provide the multi-carrier currently used by the MS, the MS can receive a paging message from the NBS by performing carrier switching.

On the other hand, if the PG ID of the SBS is different from that of the NBS, the MS can perform location update to the NBS at step S770. Needless to say, the MS may simultaneously perform the location update and the carrier switching according to the above-mentioned conditions.

The embodiment shown in FIG. 7 may also be applied to the following embodiments of FIGS. 8 to 11.

Figure 8:
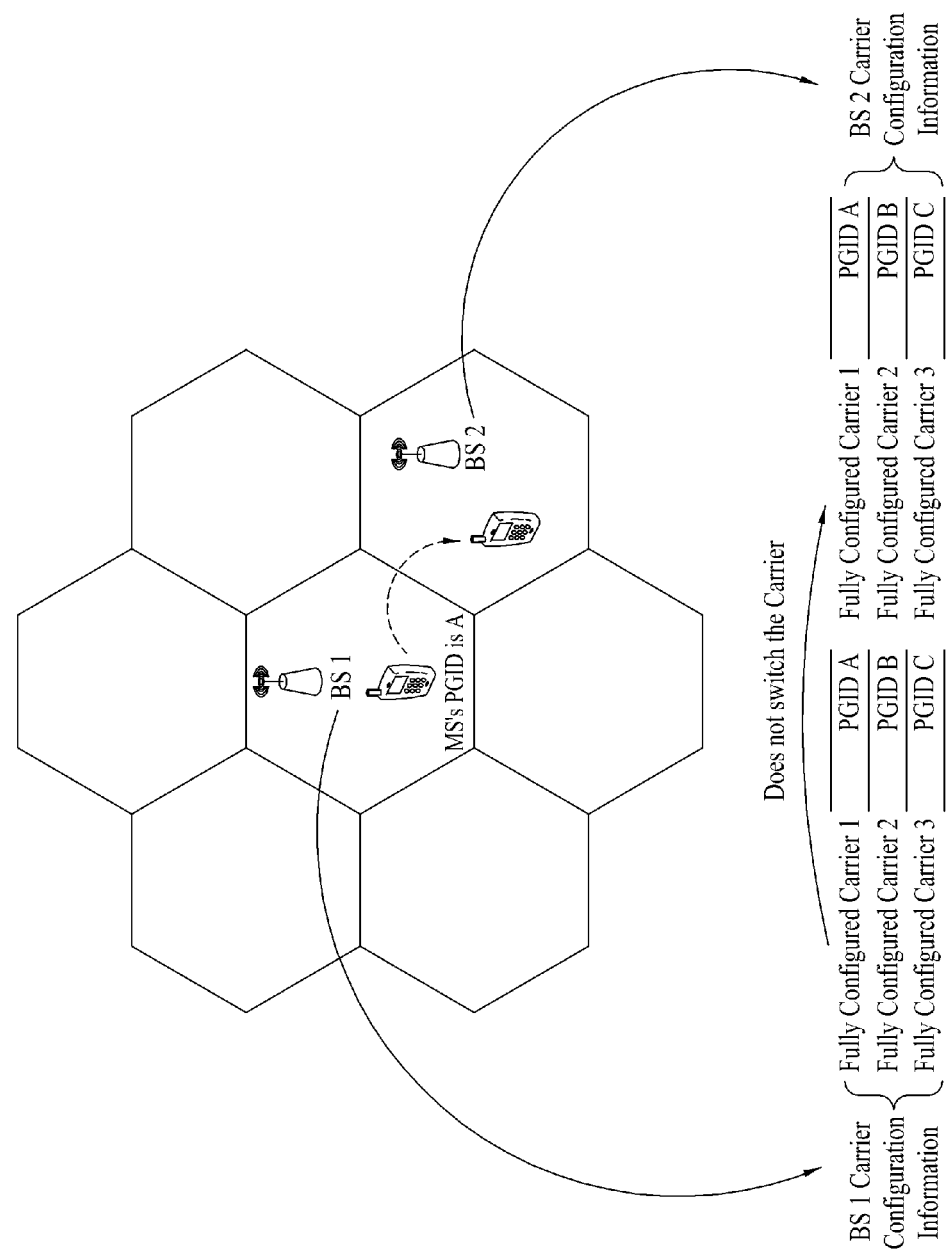
FIG. 8 is a conceptual diagram illustrating a method for enabling an idle mode MS to receive a paging message when the idle mode MS moves between base stations (BSs) supporting multiple carriers (multi-carrier) according to another embodiment of the present invention.

FIG. 8 is a conceptual diagram illustrating a method for enabling an idle mode MS to receive a paging message when an idle mode MS moves between BSs supporting multiple carriers (multi-carrier) according to another embodiment of the present invention.

Referring to FIG. 8, the idle mode MS is assigned a PG ID (A) from a serving BS (BS 1). The MS may receive a BCH including CCI from the serving BS (BS 1) periodically or whenever a specific condition is satisfied. In this case, multi-carriers used by the serving BS (BS 1) may include an FCC 1 for supporting the PG ID (A), an FCC 2 for supporting a PG ID (B), an FCC 3 for supporting a PG ID (C), etc.

The idle mode MS may move between BSs supporting multiple carriers. That is, the MS may move from the serving BS (BS 1) to the neighboring BS (BS 2). FIG. 8 is a conceptual diagram illustrating an exemplary case in which the MS moves to a neighboring BS having a carrier (FCC 1) supporting the PG ID (A) of the MS.

After the idle mode MS has moved to the NBS (BS 2), it can receive the BCH having the CCI from the NBS (BS 2) during a paging listening interval. The MS recognizes the CCI that has been transmitted from the NBS (BS 2) (See Tables 1 and 2), such that it can acquire information of multi-carriers supplied from the NBS (BS 2). In other words, the MS can recognize PG IDs supported by a Fully Configured Carrier (FCC) of the NBS (BS 2). In this case, multi-carriers used by the BS 2 may include an FCC 1 supporting a PG ID (A), an FCC 2 for supporting a PG ID (B), an FCC 3 for supporting a PG ID (C), etc.

Therefore, since the neighboring BS NBS (BS 2) supports the same PG ID as the PG ID (A) of the MS, the MS may not perform location update to the NBS (BS 2). In addition, the BS 2 provides the FCC 1, and the FCC 1 supports the PG ID (A). That is, the BS 2 also provides the FCC 1 currently used by the MS, the MS may not perform carrier switching as necessary. Namely, the MS can continuously receive a paging message through the current FCC 1.

Figure 9:
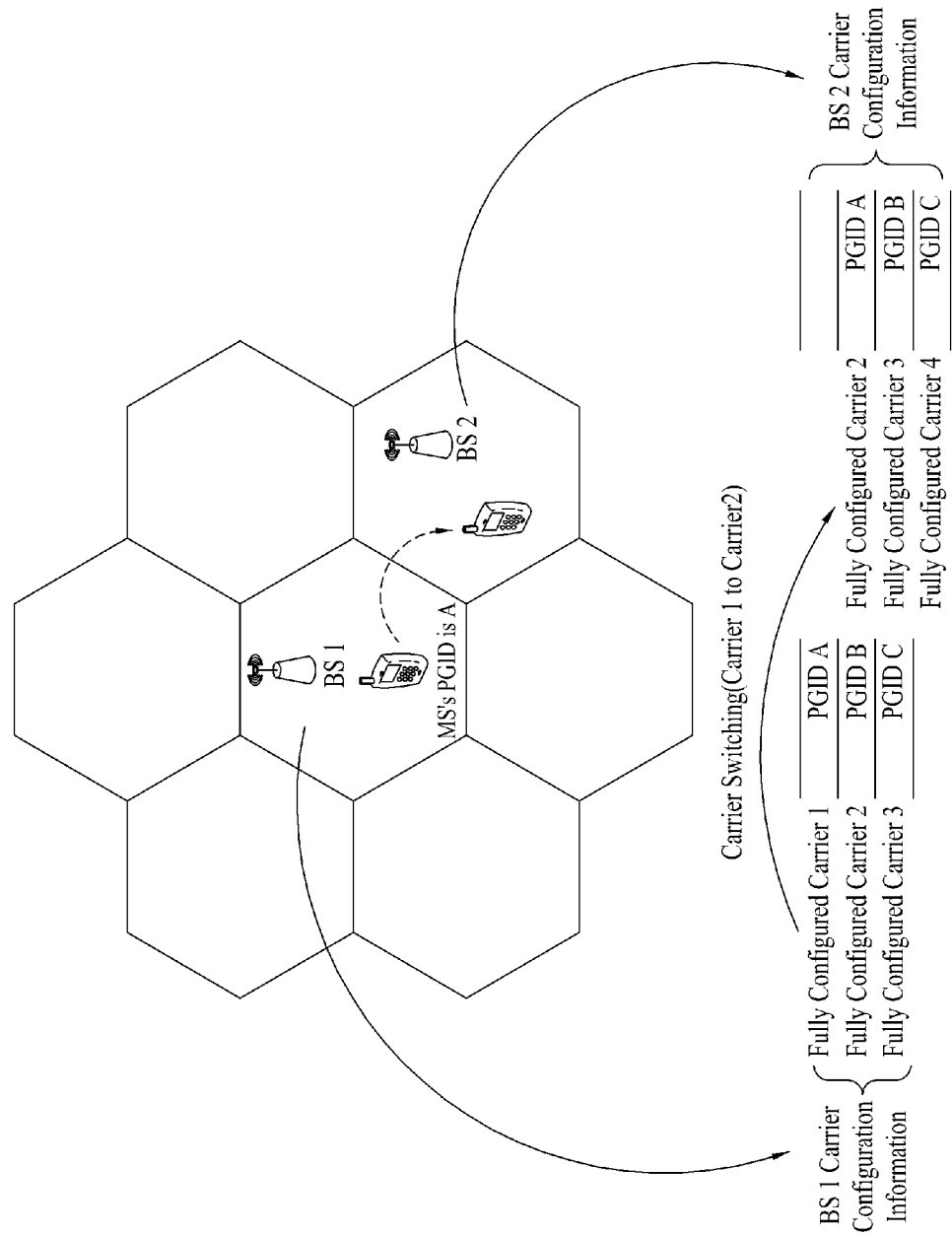
FIG. 9 is a conceptual diagram illustrating a method for enabling an idle mode MS to receive a paging message when the idle mode MS moves between base stations (BSs) supporting multiple carriers (multi-carrier) according to another embodiment of the present invention.

FIG. 9 is a conceptual diagram illustrating a method for enabling an idle mode MS to receive a paging message when the idle mode MS moves between BSs supporting multiple carriers according to another embodiment of the present invention.

Multi-carriers supplied from the SBS (BS 1) are equal to those of FIG. 8. However, multi-carriers supplied from the NBS (BS 2) may be different from those of the SBS (BS 1). That is, the NBS (BS 2) assumes that an MS in an idle mode does not support the FCC 1 assigned to the idle mode MS. Therefore, the MS may perform carrier switching so as to receive an idle mode service.

Referring to FIG. 9, a PG ID assigned to the MS is a PG ID (A), and the MS may move from the SBS (BS 1) to the NBS (BS 2). The MS may receive a BCH including CCI from the BS 2 during the paging listening interval. Therefore, the MS recognizes the CCI of the BS 2 (See Tables 1 and 2), such that it can recognize PG IDs of FCCs supplied from the BS 2.

However, the BS 2 provides an FCC that supports the same PG ID (A) as in the MS, but the FCC2 supports the PG ID (A) at the NBS (BS 2). Therefore, the MS may switch its own carrier to the FCC2 supporting the PG ID (A). That is, the MS may receive a paging message using the FCC 2 in a cell area of the NBS (BS 2).

Figure 10:
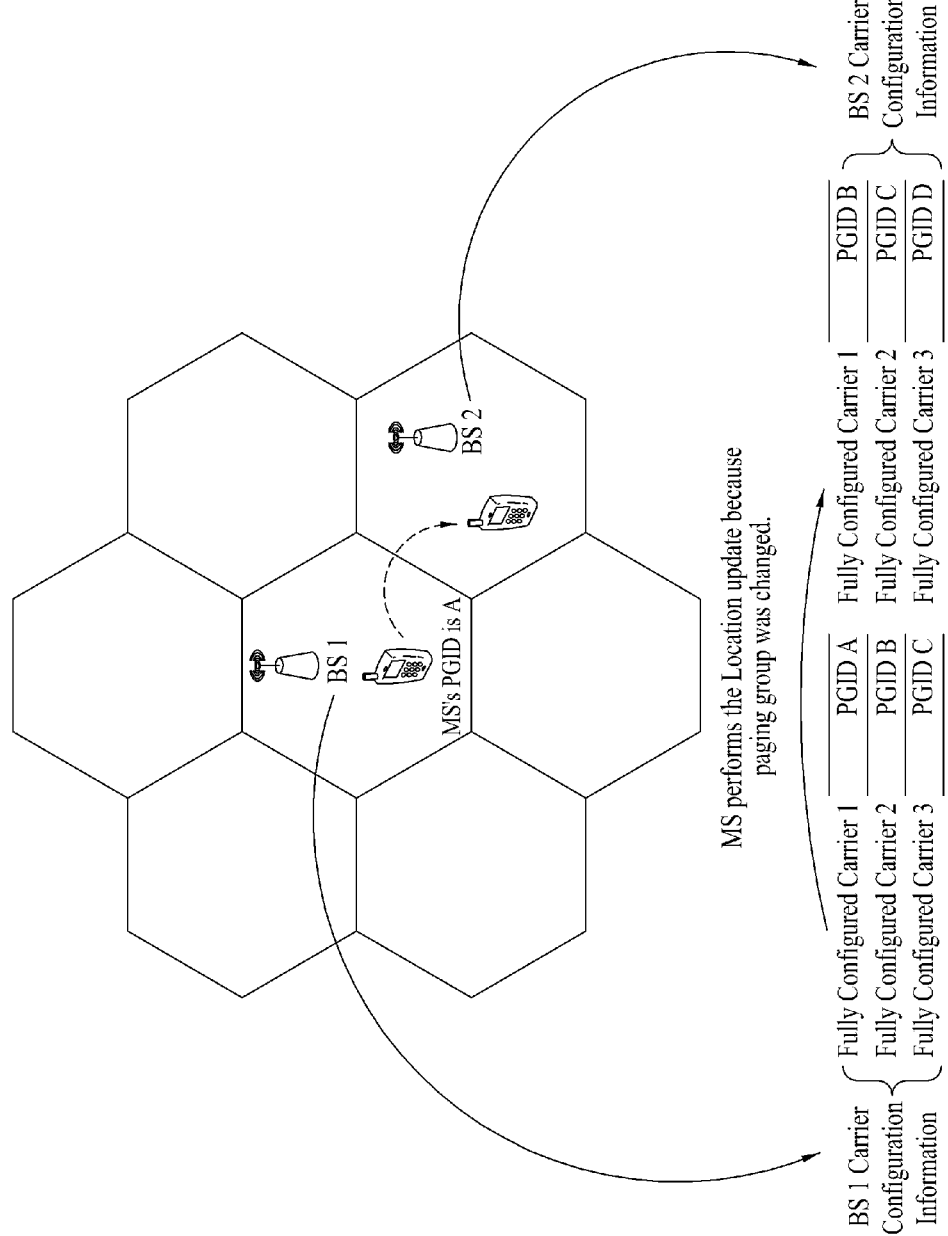
FIG. 10 is a conceptual diagram illustrating a method for enabling an idle mode MS to receive a paging message when the idle mode MS moves between base stations (BSs) supporting multiple carriers (multi-carrier) according to yet another embodiment of the present invention.

FIG. 10 is a conceptual diagram illustrating a method for enabling an idle mode MS to receive a paging message when the idle mode MS moves between base stations (BSs) supporting multiple carriers (multi-carrier) according to yet another embodiment of the present invention.

Multi-carriers supplied from the SBS (BS 1) are equal to those of FIG. 8. Also, multi-carriers supplied from the NBS (BS 2) may be equal to those of the SBS (BS 1). However, it is assumed that the FCC 1 supplied from the NBS (BS 2) provides a PG ID (B) instead of a PG ID (A).

The PG ID assigned to an idle mode MS is the PG ID (A), and the idle mode MS may move from the BS 1 to the BS 2. The MS may receive a BCH including CCI from the BS 2 during the paging listening interval. Therefore, the MS recognizes the CCI of the BS 2 (See Tables 1 and 2), such that it can recognize PG IDs of FCCs supplied from the BS 2.

In FIG. 10, the BS 2 provides an FCC 1, an FCC 2, and an FCC 3. The FCC 1 of the BS 2 supports the PG ID (B), the FCC 2 supports the PG ID (C), and the FCC 3 supports the PG ID (D). That is, the BS 2 provides the FCC 1 and does not provide services related to the PG ID (A).

Therefore, the BS 2 does not provide the FCC supporting the PG ID (A), so that it can perform location update to the BS 2. That is, the MS may switch its own paging group to another paging group by updating its location. However, the BS 2 provides the FCC 1, so that it is preferable that the MS switches a paging group to another paging group B having the PG ID (B) supported by the FCC 1. Needless to say, the MS may perform the location update and the carrier switching at the same time. The MS may receive a paging message through the FCC 1.

Figure 11:
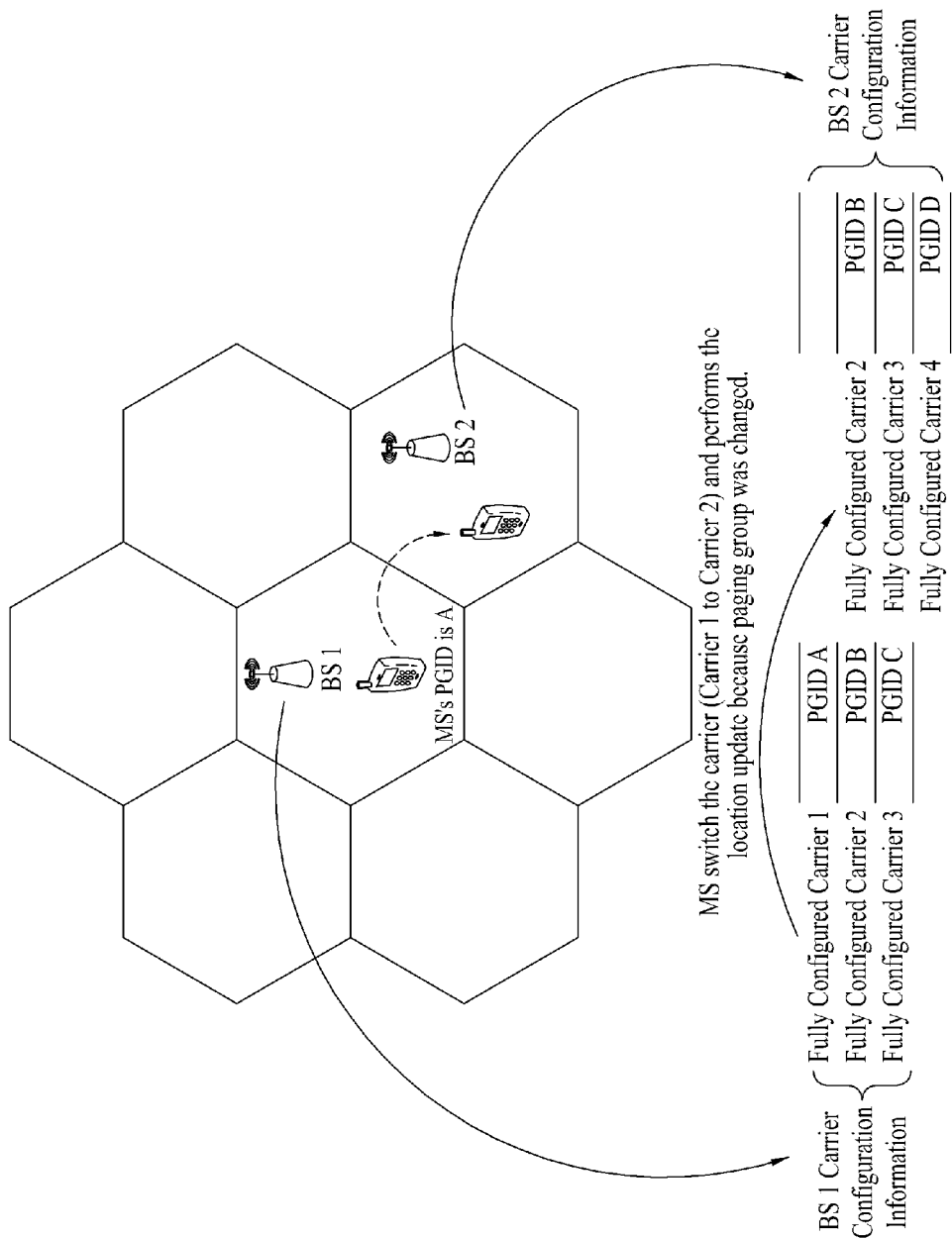
FIG. 11 is a conceptual diagram illustrating a method for enabling an idle mode MS to receive a paging message when the idle mode MS moves between base stations (BSs) supporting multiple carriers (multi-carrier) according to yet another embodiment of the present invention.

FIG. 11 is a conceptual diagram illustrating a method for enabling an idle mode MS to receive a paging message when the idle mode MS moves between BSs supporting multiple carriers (multi-carrier) according to yet another embodiment of the present invention.

FIG. 11 is a conceptual diagram illustrating an exemplary case in which the idle mode MS performs location update and carrier switching at the same time.

Multi-carriers supplied from the SBS (BS 1) shown in FIG. 11 are equal to those of FIG. 8. Also, multi-carriers supplied from the NBS (BS 2) may be equal to those of the SBS (BS 1). However, it is assumed that multi-carriers and supplied from the NBS (BS 2) and PG IDs thereof are different from those of the SBS (BS 1).

Referring to FIG. 11, the PG ID assigned to an idle mode MS is the PG ID (A), and the idle mode MS may move from the BS 1 to the BS 2. The MS may receive a BCH including CCI from the BS 2 during the paging listening interval. Therefore, the MS recognizes the CCI contained in the BCH (See Tables 1 and 2), such that it can recognize PG IDs of FCCs supplied from the BS 2.

The BS 2 does not provide a PG ID (A) and the FCC supporting the PG ID (A). Therefore, the MS performs location update to the BS 2 (i.e., switching from the paging group A to the paging group B), and at the same time performs carrier switching.

Now a description will be made of an MS and a BS (macro BS (MBS) or femto BS (FBS)) for implementing the above-described exemplary embodiments of the present invention, according to an exemplary embodiment of the present invention.

The MS may operate as a transmitter on an uplink and as a receiver on a downlink, while the BS may operate as a receiver on the uplink and as a transmitter on the downlink. That is, each of the MS and the BS may include a transmitter and a receiver for transmission and reception of information or data.

The transmitter and the receiver may include processors, modules, parts, and/or means for implementing the exemplary embodiments of the present invention. Especially, the transmitter and the receiver may include a module (means) for encrypting messages, a module for interpreting encrypted messages, an antenna for transmitting and receiving messages, etc. An example of the transmitter and the receiver will be described below with reference to FIG. 12.

Figure 12:
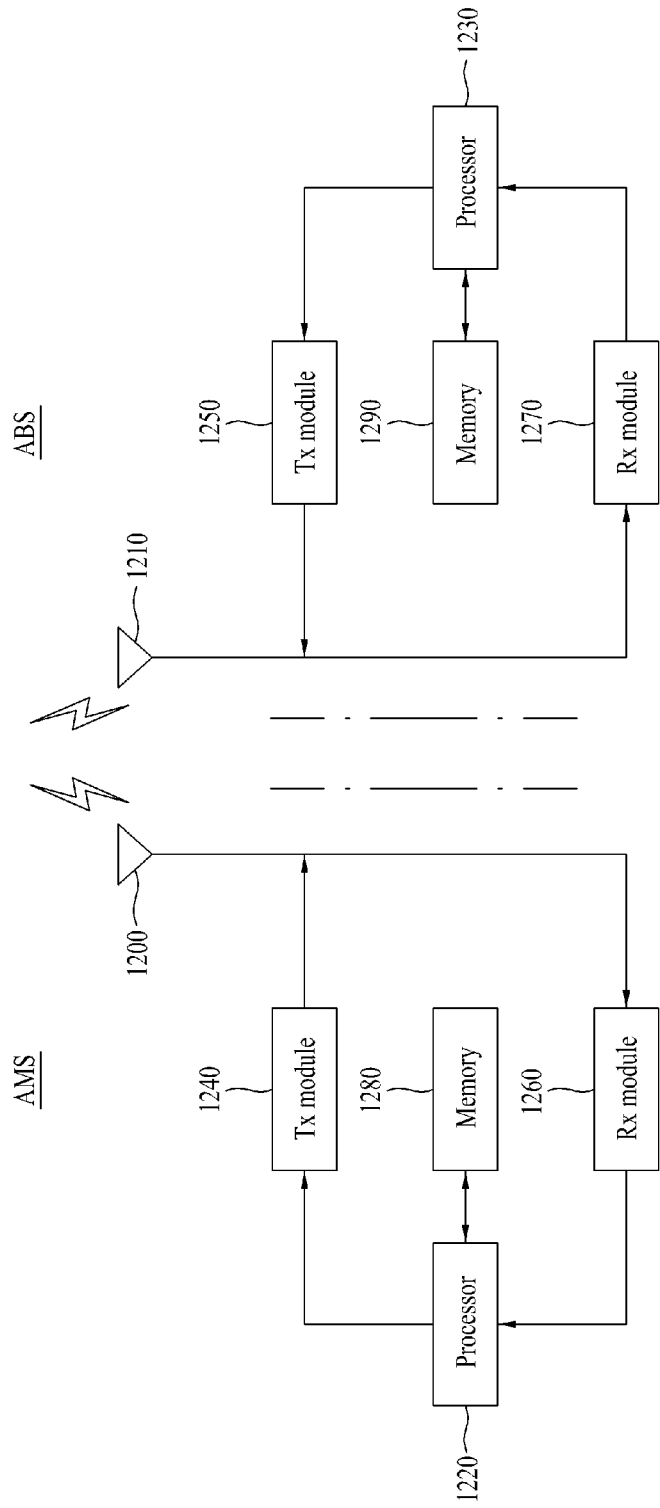
FIG. 12 is a block diagram illustrating an example of a transmitter and a receiver according to an embodiment of the present invention.

FIG. 12 is a block diagram of a transmitter and a receiver according to an exemplary embodiment of the present invention.

Referring to FIG. 12, the left part corresponds to the transmitter and the right part corresponds to the receiver. Each of the transmitter and the receiver may include an antenna 1200 or 1201, a processor 1202 or 1203, a Transmission (Tx) module 1205 or 1204, a Reception (Rx) module 1207 or 1206, and a memory 1209 or 1208. The components of the transmitter are the counter parts of those of the receiver. The components of the transmitter and the receiver will be described below in more detail.

The antennas 1200 and 1201 include Tx antennas for transmitting signals generated from Tx modules 1205 and 1204 and Rx antennas for receiving radio frequency (RF) signals and providing the received RF signals to the Rx modules 1207 and 1206. If Multiple Input Multiple Output (MIMO) is supported, two or more antennas may be provided.

The processors 1202 and 1203 generally provide overall control to the transmitter and the receiver, respectively. Especially, the processors 1202 and 1203 may perform a control function for implementing the above-described exemplary embodiments of the present invention, a variable MAC frame control function based on service characteristics and a propagation environment, a handover function, an authentication and encryption function, etc.

Particularly, the processor of the MS may perform location update or carrier switching between BSs on the basis of multi-carrier configuration information according to the exemplary embodiments of the present invention.

For example, the idle mode MS according to embodiments of the present invention receives a first CCI including at least one multi-carrier configuration information from the serving BS (SBS) via a reception (Rx) antenna, and receives a second CCI from a neighboring BS (NBS). The first CCI or the second CCI may include multi-carrier indexes and paging group IDs supported by respective multi-carriers.

In this case, the processor of the MS may perform location update to the neighboring BS (NBS) on the condition that the NBS does not support the paging group ID that has been assigned to the MS from the serving BS (SBS). Also, in the case where the neighboring BS (NBS) does not provide the carrier currently used by the MS, the process of the MS may switch the current carrier to one of multiple carriers supported by the NBS.

Meanwhile, the processor of the BS may perform scheduling by interpreting a MAC message or data received from the MS, allocating required uplink resources to the MS, generating an uplink grant carrying information about the resource allocation to the MS, and transmitting the uplink grant to the MS. In addition, the processor of the BS may receive a message including an ID required for the MS, such as a STation Identifier (STID), a Flow ID (FID), etc. from another processor or generate it, and then transmit it to the MS. Or the processor of the BS may transmit a super frame header, including a field indicating a frame at which a message including CCI is transferred, to the MS. In addition, the processor of the BS may transmit a message including the CCI to the MS via the frame indicated by the above field.

The Tx modules 1205 and 1204 may encode and modulate transmission data scheduled by the processors 1202 and 1203 in a predetermined coding and modulation scheme and provide the modulated data to the antennas 1200 and 1201. Each pair of the Tx module 1205 and the antenna 1200, and the Tx module 1204 and the antenna 1201 may be shown to be incorporated into a single transmission part, while shown separately in FIG. 12.

The Rx modules 1207 and 1206 may recover original data by demodulating and decoding data received through the antennas 1200 and 1201 and provide the recovered data to the processors 1202 and 1203. Each pair of the Rx module 1207 and the antenna 1200, and the Rx module 1206 and the antenna 1201 may be shown to be incorporated into a single reception part, while shown separately in FIG. 12.

The memories 1209 and 1208 may store programs for processing and control of the processors 1202 and 1203 and temporarily store input/output data (on the side of the MS, an uplink grant received from the BS, system information, an STID, an FID, an action time, etc.). Each of the memories 1209 and 1208 may include at least one of storage media types such as a flash memory type, a hard disk type, a multimedia card micro type, a card-type memory (e.g. a Secure Digital (SD) or eXtreme Digital (XD) memory), a Random Access Memory (RAM), a Static Random Access Memory (SRAM), a Read-Only Memory (ROM), an Electrically Erasable Programmable Read-Only Memory (EEPROM), a Programmable Read-Only Memory, a magnetic memory, a magnetic disc, an optical disc, etc.

In the mean time, the BS may perform a control function for implementing the above-described exemplary embodiments of the present invention, Orthogonal Frequency Division Multiple Access (OFDMA) packet scheduling, Time Division Duplex (TDD) packet scheduling and channelization, a variable MAC frame control function based on service characteristics and a propagation environment, a real-time high-speed traffic control function, a handover function, an authentication and encryption function, a packet modulation/demodulation function for data transmission and reception, a high-speed packet channel coding function, a real-time MODEM control function, etc., by at least one of the above-described modules, or the BS may further include an additional module, part or means for performing these functions.

Mode for the Invention

Various embodiments have been described in the best mode for carrying out the invention.

INDUSTRIAL APPLICABILITY

The exemplary embodiments of the present invention are applicable to various wireless access systems. For example, the wireless access systems are a 3GPP system, a 3GPP2 system, and/or an IEEE 802.xx system. Besides the wireless access systems, the exemplary embodiments of the present invention are applicable to all technical fields in which the wireless access systems find their applications.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it is obvious to those skilled in the art that claims that are not explicitly cited in each other in the appended claims may be presented in combination as an exemplary embodiment of the present invention or included as a new claim by a subsequent amendment after the application is filed.

The invention claimed is:

1. A method for performing a paging procedure in a wireless access system supporting multiple carriers, the method comprising:
receiving by a Mobile Station (MS), from a first Base Station (BS), a Super Frame Header (SFH) including a Start Frame Number (SFN) field that indicates an index of a frame at which system information is transmitted, the system information including first carrier configuration information (CCI) corresponding to a first set of multiple carriers currently supported by the first BS;

receiving by the MS, from the first BS, second CCI at a first downlink frame at which a paging listening interval of the MS begins, the second CCI corresponding to a second set of multiple carriers supported by a second BS;

determining whether to perform a location update and carrier switching using the first CCI and the second CCI when the MS moves from the first BS to the second BS; and performing, by the MS, a paging procedure with the second BS based on a paging message received from the second BS, wherein the first CCI includes indexes of the first set of multiple carriers and a paging group ID supported by each carrier of the first set of multiple carriers, and wherein the second CCI includes indexes of the second set of multiple carriers and a paging group ID supported by each carrier of the second set of multiple carriers.

2. The method according to claim 1, wherein:
the first BS is a Serving BS; and
the second BS is a Neighboring BS.

3. The method according to claim 1, further comprising:
performing, by the MS, the location update to the second BS when the second BS does not provide, in the second CCI, a paging group ID assigned to the MS.

4. The method according to claim 1, further comprising:
performing, by the MS, the carrier switching to one of the multiple carriers supported by the second BS when the second BS does not support a carrier currently used by the MS.

5. A Mobile Station (MS) in a wireless access system supporting multiple carriers, the MS comprising:
a receiver configured for:
receiving an external radio signal;
receiving a Super Frame Header (SFH) from a first Base Station (BS), the SFH including a Start Frame Number (SFN) field that indicates an index of a frame at which system information is transmitted, the system information including first carrier configuration information (CCI) corresponding to a first set of multiple carriers currently supported by the first BS; and receiving, from the first BS, second CCI at a first downlink frame at which a paging listening interval of the MS begins, the second CCI corresponding to a second set of multiple carriers supported by a second BS; and a processor configured for:
determining whether to perform a location update and carrier switching using the first CCI and the second CCI when the MS moves from the first BS to the second BS; and performing a paging procedure with the second BS based on a paging message received from the second BS, wherein the first CCI includes indexes of the first set of multiple carriers and a paging group ID supported by each carrier of the first set of multiple carriers, and wherein the second CCI includes indexes of the second set of multiple carriers and a paging group ID supported by each carrier of the second set of multiple carriers.

6. The mobile station according to claim 5, wherein the processor is further configured for performing the location update to the second BS when the second BS does not provide, in the second CCI, a paging group ID assigned to the MS.

7. The mobile station according to claim 5, wherein the processor is further configured for performing the carrier switching to one carrier of the multiple carriers supported by the second BS when the second BS does not provide a carrier currently used by the MS.

8. The mobile station according to claim 5, wherein:
the first BS is a Serving BS; and
the second BS is a Neighboring BS.

* * * * *